Patented Feb. 15, 1938

2,108,156

UNITED STATES PATENT OFFICE 2,108,156

PROCESS FOR THE PRODUCTION OF KETONES

Charles G. Wortz, Wilmington, Del., assignor to E. I. du Pont de Nemours & Company, Wilmington, Del., a corporation of Delaware No Drawing. Application February 2, 1937, Serial No. 123,604

17 Claims. (Cl. 260—134)

This invention relates to the production of ketones by catalytic decarboxylation of carboxylic acids and esters of said acids in the vapor phase, and more particularly to the use of the chromites of manganese and zinc as catalysts for the reaction.

The use of oxides or carbonates of metals as vapor phase catalysts for the decarboxylation of aliphatic acids to ketones was initiated by E. R. Squibb in 1895, and his work was based upon the much earlier practice of heating metallic salts of acids to get ketones. Since that time practically all metallic oxides of any possible interest for the reaction have been tried, as well as certain other metallic compounds such as aluminates, phosphates, and silicates. These catalysts have a number of disadvantages, however, such as high cost, difficult method of preparation, susceptibility to corrosion, or disintegration, and low activity. These difficulties can be largely avoided by the use of the invention described herein.

The object of this invention is the preparation of ketones by the catalytic decarboxylation of carboxylic acids and esters of said acids in the vapor phase. A further object is the use of chromites of metals selected from the group consisting of manganese and zinc to promote the decarboxylation of carboxylic acids in the vapor phase.

These objects are accomplished by the following invention in which a monocarboxylic acid is passed at an elevated temperature over a catalyst comprising a chromite of a metal selected from the group consisting of manganese and zinc, and the product collected in a suitable receiver. The ketone recovered from the product by the well known methods of organic chemistry is valuable as a solvent or as an intermediate in the preparation of waxes and detergents.

The following examples describe in detail several embodiments of the invention and are presented for the purpose of illustrating said invention.

Example I

A solution of ammonium chromate, prepared by neutralizing 300 grams of chromium trioxide with 398 cc. of 28.5% ammonia and making up to 1.5 liters with water, is slowly introduced, with constant stirring, into a solution of 1077 grams of 50% manganese nitrate solution made up to 1.5 liters with water. The solution is adjusted to near the neutral point by the further addition of 154 cc. of 28.5% ammonia. The precipitate is filtered with suction, freed of excess solution, dried at 110° C. and ignited at 400 C., whereby the double manganese ammonium chromate initially precipitated is decomposed to form manganese chromite. The resultant black powder is not suitable for use as such in vapor phase reactions, but must be converted into a granular form. This may be done by mixing the powder with water to form a very stiff dough, drying the wet mass, crushing to pass through a 14 mesh screen and briquetting in a tablet machine after addition of 2% graphite to serve as a die lubricant. A tablet of $\tfrac{3}{16}$ inch in diameter is of satisfactory size for the purposes of this invention.

Caprylic acid is introduced at the rate of 60 grams per hour into the top of a vertical 1½ inch inside diameter glass tube heated by a split type electric furnace. The reaction tube is packed wtih 250 cc. of 8–14 mesh fused silica to serve as preheating surface and with 145 cc. of the pelleted manganese chromite catalyst prepared as described above. The temperature of the catalyst mass is adjusted to the point where ½ mol. of gas, almost pure $CO_2$ is evolved per mol. of injected acid, usually 400° to 415° C. A solid white product results which is purified by extraction with aqueous sodium carbonate solution to remove unchanged acid, followed by crystallization from 80% ethyl alcohol. The yield of caprylone based on analytical examination of the product is over 99%, only about 0.4% the acid remaining unchanged.

Example II

Caprylic acid was introduced at the rate of 7.6 grams (0.053 mol.) per hour into the top of a vertical 1 inch I. D. glass tube packed with 10 cc. of the pelleted manganese chromite catalyst prepared as described in Example I and heated to 350° C. by means of a split-type electric furnace. Carbon monoxide was introduced into the furnace along with the caprylic acid at the rate of 0.07 mols per hour. A 70% yield of caprylone was obtained.

In the above experiment the carbon monoxide functioned as a carrier gas to help sweep the acid over the heated catalyst mass. This is an unexpected result since normally under the conditions of the above the formation of aldehyde would be predicted; contrary to this expectation, however, only ketone was found to be produced.

Example III

A solution of ammonium chromate, prepared by neutralizing 400 grams of chromium trioxide with 540 cc. of 28.5% ammonia and making up to two liters with water, is slowly introduced with constant stirring into a solution of 1190 grams of zinc nitrate hexahydrate made up to two liters with water. The solution is adjusted to near the neutral point by further addition of about 250 cc. of 28.5% ammonia. The precipitate is filtered with suction, freed of excess solution, dried at 110° C. and ignited at 400° C., whereby the double zinc ammonium chromate initially precipitated is decomposed to form zinc chromite. The resultant dark gray powder is not suitable for use as such in vapor phase reactions but must be converted into a granular form. This may be done by mixing the powder with water to form a very stiff dough, drying the wet mass, crushing to pass through a 14 mesh screen and briquetting in a tablet machine after addition of 2% graphite to serve as a die lubricant. A tablet $\frac{3}{16}$ inch in diameter is of satisfactory size for the purposes of this invention. The catalyst thus obtained contains a small amount of undecomposed chromate but is ready for use in the ketone process without any further treatment.

Caprylic acid is introduced at the rate of 60 grams per hour into the top of a vertical 1½ inch I. D. glass tube heated by a split type electric furnace. The reaction tube is packed with 250 cc. of 8–14 mesh fused silica to serve as preheating surface and with 145 cc. of the pelleted zinc chromite catalyst prepared as described above. The temperature of the catalyst mass is adjusted to the point where ½ mol. of gas, mostly $CO_2$, is evolved per mol. of injected acid, usually 400° to 415° C. A solid product results which is purified by extraction with aqueous sodium carbonate solution to remove unchanged acid, followed by crystallization from 80% ethyl alcohol. The yield of caprylone based on analytical examination of the product is 87%, and the recovery of purified ketone is about 80% of theory.

By way of contrast a zinc oxide catalyst was prepared by heating 500 cc. of 8–14 mesh lump silica gel in a vacuum at 400° C. for 15 hours, cooling and impregnating while still under a vacuum with a solution of 61.9 grams of zinc nitrate hexahydrate in 500 cc. of solution, filtering off the excess liquor, drying at 110° C., and igniting at 400° C. to decompose the nitrate. This catalyst was tested by the same procedure followed above except that the reaction temperature was raised to 435° C. in an attempt to increase the activity of the catalyst. Although it is well known that silica gel enhances the activity and life of catalysts by serving as a highly porous support, this catalyst gave only a 51% conversion of the caprylic acid to caprylone as compared with 87% for the chromite. Zinc oxide may be taken as representative of the best performance of the supported oxide type of catalyst.

*Example IV*

The same procedure is followed as in Example I, except that a mixture of 1 mol. of lauric acid and 2 mols of butyric acid is passed over 162 cc. of zinc chromite catalyst. By distilling the product under reduced pressure 53.7% of the lauric acid is recovered as pentadecanone-4 and 40.5% as laurone. The butyric acid not reacting to form the mixed ketone is recovered as dipropyl ketone.

The above process of ketonization may be applied satisfactorily to any monocarboxylic acid which can be volatilized without decomposition at atmospheric or subatmospheric pressures. While previous investigators have maintained that lauric acid represents the upper limit of molecular weight for vapor phase operation, stearic acid has been satisfactorily ketonized by this method at atmospheric pressure. Examples of monocarboxylic acids that may be used in this process are such aliphatic acids as butyric, valeric, caproic, heptoic, nonoic, undecylic, palmitic, stearic, etc., and the aryl or aralkyl substituted aliphatic acids such as phenyl-acetic, phenyl-propionic, cyclohexyl acetic, etc. Mixtures of symmetrical and unsymmetrical ketones may be obtained by employing mixtures of the above acids.

While a temperature around 400° C. gives the best results with the chromite catalysts the process is operable between 250° and 500° C. Lowering the temperature results in decreased conversion, while at higher temperatures side reactions are increased.

In general, lower conversions to the desired ketones are obtained if pressures higher than atmospheric are used; the use of reduced pressures, however, is desirable particularly when operating with acids boiling higher than lauric since improved yields are obtained thereby. Although uncombined acids are preferred raw materials in the process, esters may also be used especially in the case of acids boiling higher than lauric, particularly the methyl and ethyl esters since losses through thermal decompositions are thereby minimized.

Zinc chromite and manganese chromite prepared by any method which gives a catalytically active substance may be used in this process. The procedure given under Examples I and III for the preparation of manganese chromite and zinc chromite is generally applicable to the preparation of simple or mixed chromites. In place of the manganese and zinc nitrates of the examples, other salts such as the chloride or sulfate may be used but the former is preferred because the resulting catalysts are more selectively active for the ketonization reaction described herein. The temperature of precipitation as well as the method employed in washing the precipitate have no significant effect on the activity of the resulting catalyst.

Manganese chromite is the preferred catalyst for the reaction but zinc chromite gives satisfactory results. The preferred method for preparing the catalysts is that described in the examples.

By means of these chromites a wide variety of ketones can be prepared. The latter are valuable as solvents and as intermediates in the preparation of waxes, detergents and other derivatives.

As catalysts for the ketone process the chromites have a number of advantages over other compounds of the corresponding metals. The chromate from which the chromite is prepared is precipitated by a simple, easily controlled procedure, filters and dries readily and upon ignition gives a product with remarkably constant properties. Oxides and silicates, on the other hand, vary in activity with the precipitation procedure, are susceptible to corrosion, or disintegration, are difficult to filter, and upon drying are not easily briquetted for use in vapor phase catalysts. A further advantage peculiar to the chromites is that the decomposition of the chromate serves to open up the catalyst and increase enormously the active surface. Oxides cannot be activated in this way and tend to lose activity on use due to sintering. Sintering of the chromites is practically negligible probably due to the dual character of the catalyst, the relatively inactive acidic portion of the compound serving as a support for the active basic portion.

While chromites in general possess some of the above desirable catalytic qualities, the chromites of manganese and zinc are unique in combining the highly desirable qualities of high initial activity and selectivity with long life.

The chromites of the more basic metals such as barium, calcium, and magnesium, however, are unsuitable for the ketonization of the higher fatty acids such as caprylic because they react therewith to form soaps, unless excessively high temperatures are used.

It is apparent that many widely different embodiments of this invention may be made without departing from the spirit and scope thereof and therefore it is not intended to be limited except as indicated in the appended claims.

I claim:

1. The process for the decarboxylation of a carboxylic group to a ketone group which comprises bringing a monocarboxylic compound selected from the class consisting of alkyl, aralkyl, and hydrogenated aralkyl monocarboxylic acids and esters of said acids in the vapor phase, at a temperature between 250° and 500° C., in contact with a chromite of a metal selected from the class consisting of manganese and zinc.

2. The process for the decarboxylation of an aliphatic monocarboxylic acid to a ketone which comprises bringing an aliphatic monocarboxylic acid in the vapor phase, at a temperature between 250° and 500° C., in contact with a chromite of a metal selected from the class consisting of manganese and zinc.

3. The process in accordance with claim 2 characterized in that the chromite is prepared by the reduction of the corresponding chromate.

4. The process in accordance with claim 2 characterized in that the chromite of the metal is prepared by thermally decomposing the double chromate of the metal with a nitrogen base.

5. The process in accordance with claim 2 characterized in that the acid is a saturated, aliphatic monocarboxylic acid.

6. The process in accordance with claim 2 characterized in that the catalyst is in pelleted form.

7. The process for the decarboxylation of an organic acid to a ketone which comprises bringing a saturated straight chain monocarboxylic acid in the vapor phase at a temperature between 250° and 500° C. in contact with a chromite of a metal selected from the class consisting of manganese and zinc.

8. The process in accordance with claim 7 characterized in that the acid is caprylic acid.

9. The process in accordance with claim 7 characterized in that the acid is lauric acid.

10. The process in accordance with claim 2 characterized in that the reaction is carried out at a temperature of about 400° C.

11. The process in accordance with claim 7 characterized in that the reaction is carried out at a temperature of about 400° C.

12. The process for the decarboxylation of an organic acid to a ketone which comprises bringing caprylic acid in the vapor phase, at a temperature between 250° and 500° C., in contact with a chromite of a metal selected from the class consisting of manganese and zinc, said chromite being derived from the double ammonium chromate of said metal by thermal decomposition thereof.

13. The process in accordance with claim 12 characterized in that the reaction is carried out at a temperature of about 400° C.

14. The process for the decarboxylation of an organic acid to a ketone which comprises bringing caprylic acid in the vapor phase, at a temperature between 250° and 500° C., in contact with manganese chromite, said manganese chromite being derived from the double ammonium chromate of manganese by thermal decomposition.

15. The process for the decarboxylation of an organic acid to a ketone which comprises bringing caprylic acid in the vapor phase, at a temperature between 250° and 500° C., in contact with zinc chromite, said zinc chromite being derived from the double ammonium chromate of zinc by thermal decomposition thereof.

16. The process for the decarboxylation of an organic acid to a ketone which comprises bringing caprylic acid in the vapor phase, at a temperature of about 400° C, to about 415° C., in contact with a pelleted manganese chromite catalyst, said manganese chromite being derived from the double manganese ammonium chromate by thermal decomposition.

17. The process for the decarboxylation of an organic acid to a ketone which comprises bringing caprylic acid in the vapor phase, at a temperature of about 400° C. to about 415° C., in contact with a pelleted zinc chromite catalyst, said zinc chromite being derived from the double zinc ammonium chromate by thermal decomposition.

CHARLES G. WORTZ.